(12) United States Patent
Edgin et al.

(10) Patent No.: US 7,042,450 B1
(45) Date of Patent: May 9, 2006

(54) INTERACTIVE USER INTERFACE GUIDES

(75) Inventors: Brian Edgin, Wylie, TX (US); David Morris, Dallas, TX (US); Jeffrey Doar, Allen, TX (US)

(73) Assignee: Macromedia, Inc., San Francisco, CA (US)

( * ) Notice: Subject to any disclaimer, the term of this patent is extended or adjusted under 35 U.S.C. 154(b) by 525 days.

(21) Appl. No.: 10/377,013

(22) Filed: Feb. 28, 2003

(51) Int. Cl.
*G06T 17/00* (2006.01)
(52) U.S. Cl. .................................. 345/420
(58) Field of Classification Search ............. 345/420
See application file for complete search history.

(56) References Cited

OTHER PUBLICATIONS

Joss, "Adobe LiveMotion", 2001.*

* cited by examiner

*Primary Examiner*—Almis Jankus
(74) *Attorney, Agent, or Firm*—Fulbright & Jaworski LLP

(57) ABSTRACT

A system and method is described for manipulating a plurality of discrete objects in a graphics application, the method comprising generating a set of coordinates for each discrete object, each discrete object bound by at least a horizontal boundary guide and a vertical boundary guide, selecting the boundary guide bounding one of the plurality of discrete objects intended for manipulation, rendering a feedback guide responsive to the selecting, dragging the feedback guide to a final location, and resizing the one of the plurality of discrete objects intended for manipulation and others of the plurality of discrete objects that have the boundary guide sharing an axis with the selected feedback slice guide responsive to the final location.

25 Claims, 6 Drawing Sheets

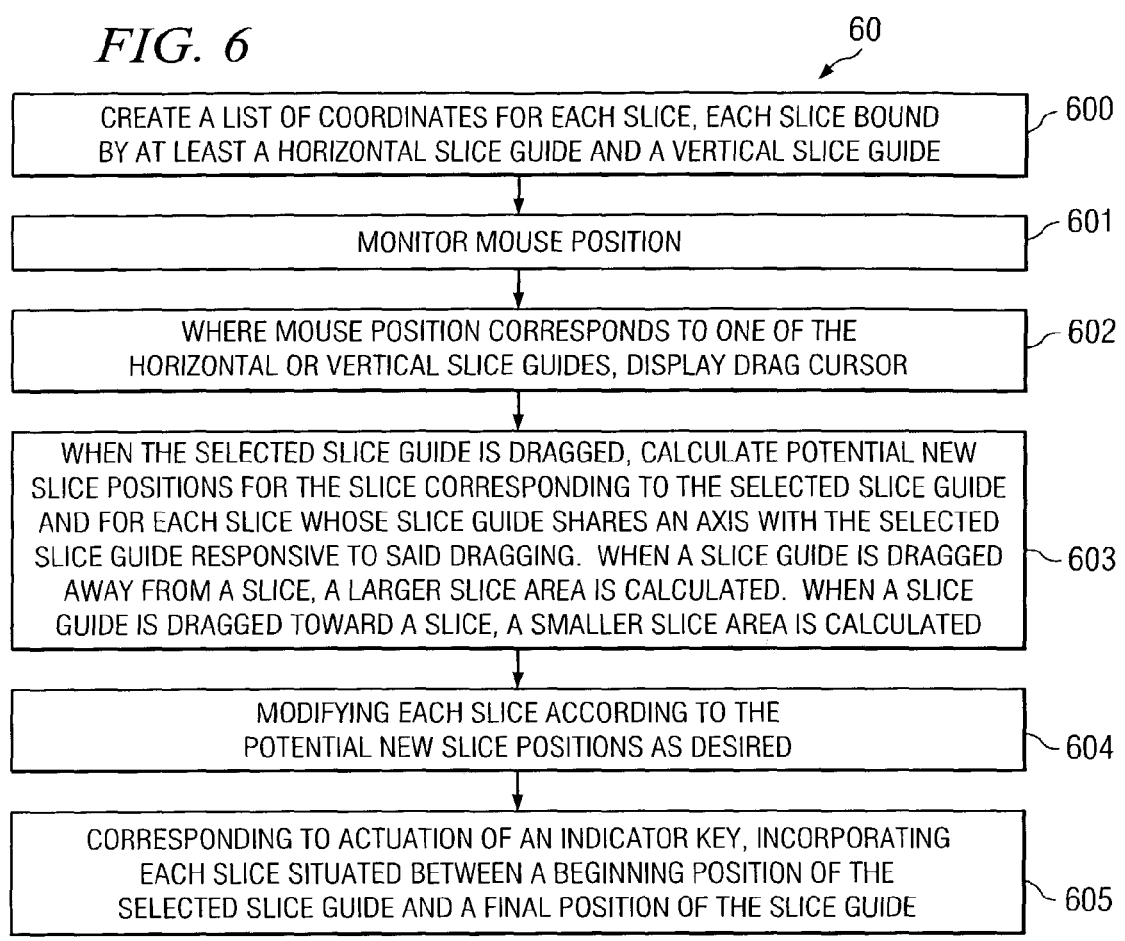
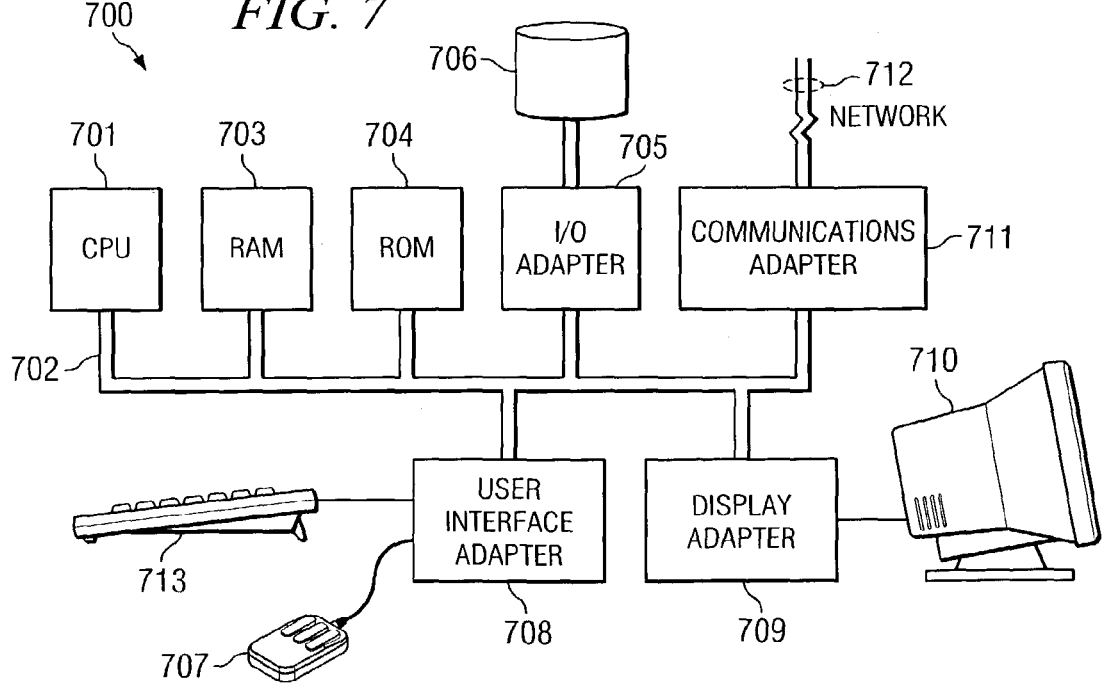

INTERACTIVE USER INTERFACE GUIDES

TECHNICAL FIELD

The present invention relates, in general, to graphics editing applications, and, more specifically, user interface tools for graphic editing applications.

BACKGROUND OF THE INVENTION

Many graphics editing applications include a function for slicing up a graphic image into specific regions. Image slicing is a technique used extensively in Web page design. Generally, a graphic artist designs a complete graphic image that will become the Web page. The graphic image may then be sliced up into specific regions to which certain behaviors, code logic, or other functionality may be assigned. If the regions are not sliced up, modifying the design or functionality of the Web page, or selected portions of the Web page is much more difficult. For example, a row of buttons may have rollover functions and links to different Uniform Resource Locators (URL). If the row is maintained in a single graphic image, there would generally be no efficient way, other than complete redesign of the entire image row, in which to modify or change the image along with its associated functionalities.

Typically, when a designer or graphic artist creates content for a Web site, the design is in flux until the final design is approved. One of the difficult things about the continual updating and modification is that every time the graphic is changed or an element is moved or functionality is changed, the slices of the graphic are also changed to correspond to the graphical and/or functional changes. Traditionally, the graphic artists and designers start from scratch on the original source graphic every time a change or modification is made. The designer then redefines the areas that need to be sliced and re-exports each of the separate areas for creation of the HTML table to fit all of the separate slices and image parts.

Current graphics applications, including MACROMEDIA's FIREWORKS™, MACROMEDIA's FREEHAND™, and ADOBE's PHOTOSHOP™, facilitate the ability to draw an object representing a slice in the graphics document, that would then cause that slice area to export as a separate image inside of an HTML document. The slice functionality in the existing graphics applications allow individual slices to be moved around and resized, which adds convenience to the design process. The difficulty in this level of functionality, however, is adjusting slices in a way to create valid or uncomplicated HTML.

If a designer mistakenly causes an overlapping region or a gap between slices, even one only misaligned by one or two pixels, the resulting HTML is far more complicated than if the slice boundaries are exactly aligned. Overlapping slices create problematic complexities. Because the different slices are provided for in different cells of the HTML table, the question arises as to which cell the overlapping portion belongs in the HTML table? Additionally, if both image slices have behaviors, which behavior takes precedence in the overlapping portion when one image slice is rolled-over? This overlap may cause execution of an unexpected behavior. Likewise, unintentional small gaps between slices cause the resulting HTML table and image files to be overly complex. These complicated situations result in complex HTML code for creating an outcome that the user is expecting. The complexity effects the ability for graphics applications to automatically generate HTML to accommodate for the misalignment, and for Web browsers to quickly load and correctly display the HTML page.

FIG. 1 is an illustration of a typical group of slices within graphics document 10. Graphics document 10 includes slices 11–14 bound by slice guides 100–106. FIG. 2 is an illustration of graphics document 10 in which a user, dragging from either of corner handles 200, enlarges slice 12 with portion 201 overlapping into slice 11. Slice 12 has been increased in size by portion 201. However, none of the other slices, including slice 11, have adjusted to match this change leaving the overlapping region between slice 12 and slice 11.

BRIEF SUMMARY OF THE INVENTION

The present invention is directed to draggable slice guides configured to allow a designer to click and drag on the boundaries between separate slices, called slice guides, or on a slice edge, and drag the slice guide to resize the slice. However, any other slices that share the same boundary or the same axis will be resized in a similar manner. The results of associating the resizing of one slice with the corresponding resizing of other neighboring slices, allows much easier modifications that maintain alignment of slice boundaries, thus, saving considerable complexity.

Representative embodiments of the present invention are directed to a method for manipulating a plurality of discrete objects in a graphics application, the method comprising generating a set of coordinates for each discrete object, each discrete object bound by at least a horizontal boundary guide and a vertical boundary guide, selecting the boundary guide bounding one of the plurality of discrete objects intended for manipulation, rendering a feedback guide responsive to the selecting, dragging the feedback guide to a final location, and resizing the one of the plurality of discrete objects intended for manipulation and others of the plurality of discrete objects that have the boundary guide sharing an axis with the selected feedback slice guide responsive to the final location.

Further representative embodiments of the present invention are directed to a method for modifying a plurality of slices on a graphics document with a single movement, the method comprising creating a list of coordinates for each slice, the each slice bound by at least a horizontal boundary slice guide and a vertical boundary slice guide, selecting the boundary slice guide bounding one of the plurality of slices intended for modification, displaying a feedback slice guide responsive to the selecting, dragging the feedback slice guide to a desired final location, and resizing the one of said plurality of slices intended for modification and others of the plurality of slices that have the boundary slice guide sharing an axis with the selected feedback slice guide responsive to the desired final location.

Further representative embodiments of the present invention are directed to a computer program product having a computer readable medium with computer program logic recorded thereon, the computer program product comprising code for creating a set of coordinates for a plurality of discrete objects, each of the plurality of discrete objects bound by at least a horizontal boundary line and a vertical boundary line, code for selecting the boundary guide bounding one of the plurality of discrete objects intended for modification, code for displaying a feedback line responsive to the code for selecting, code for dragging the feedback line to a final location, and code for resizing the one of the plurality of discrete objects intended for modification and others of the plurality of discrete objects that have the boundary line sharing an axis with the selected feedback line responsive to the final location.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 is a flowchart illustrating steps exercised in implementing selected embodiments of the present invention; and FIG. 7 illustrates a computer system adapted to implement various embodiments of the present invention.

DETAILED DESCRIPTION OF THE INVENTION

Figure 1:
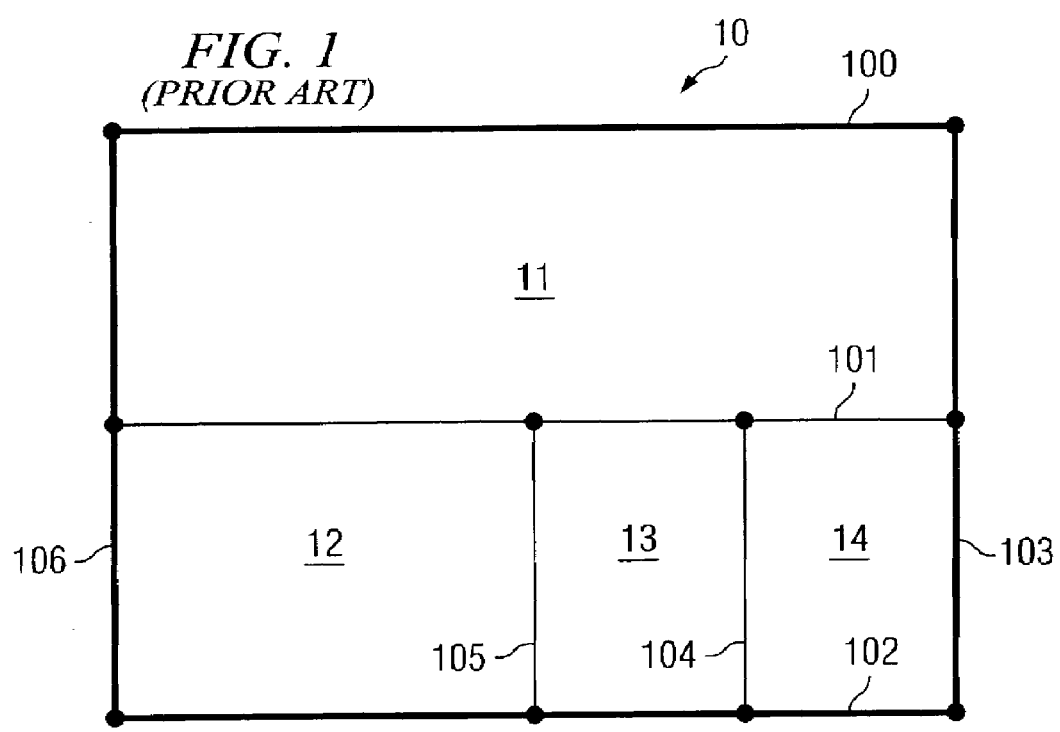
FIG. 1 is an illustration of a typical group of slices within a graphics document.
Figure 2:
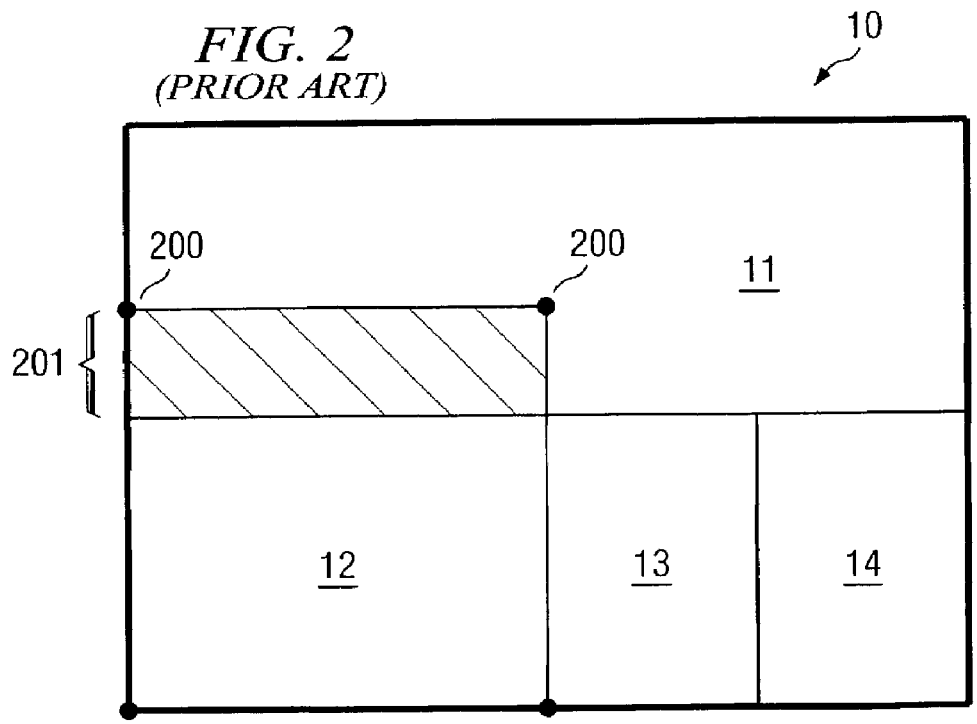
FIG. 2 is an illustration of a graphics document in which a user, dragging from either of the corner handles, enlarges a slice with a portion overlapping into another slice.
Figure 3A:
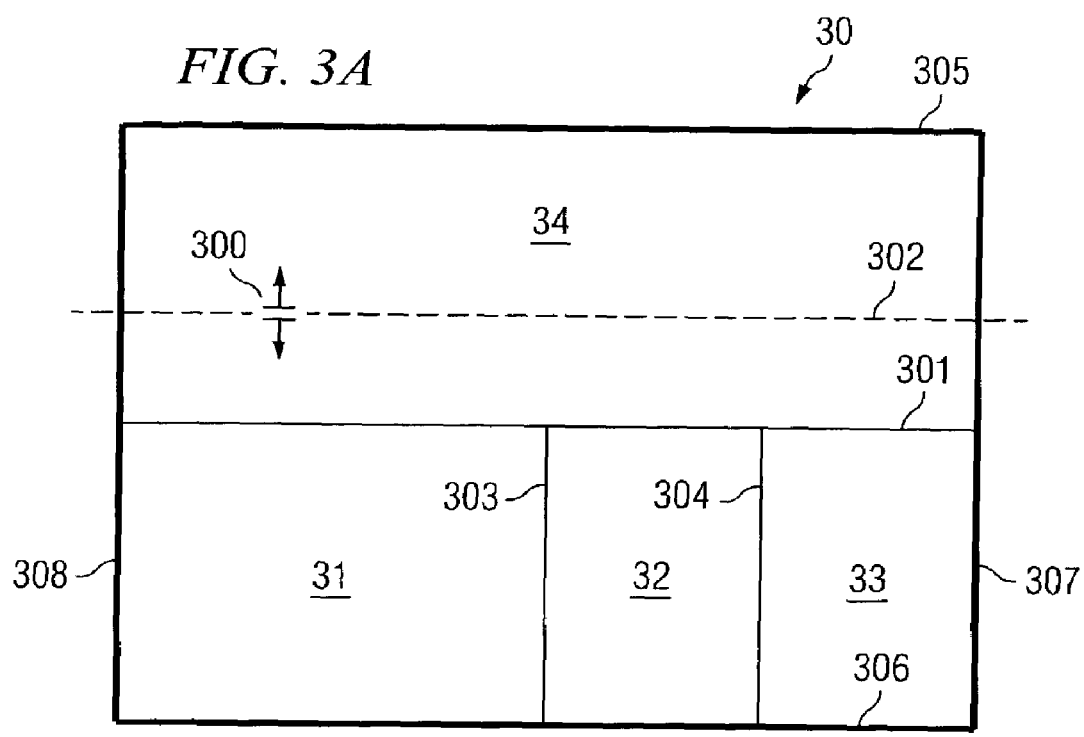
FIG. 3A is an illustration of a graphics document divided into slices and showing a feedback slice guide.

FIG. 3A is an illustration of graphics document 30 divided with slices 31–34 and showing feedback slice guide 302. Drag cursor 300 has been dragged up to feedback slice guide 302 from slice boundary 301. As feedback slice guide 302 is dragged, each of slices 31–33 with vertical slice boundaries 303 and 304 are shown potentially increased in size while slice 34 is shown potentially decreased in size. This simultaneous operation occurs because each of slices 31–34 share slice boundary 301. The results of the inclusion of the functionality would allow for multiple slices, four in this example, to be modified with one movement.

Figure 3B:
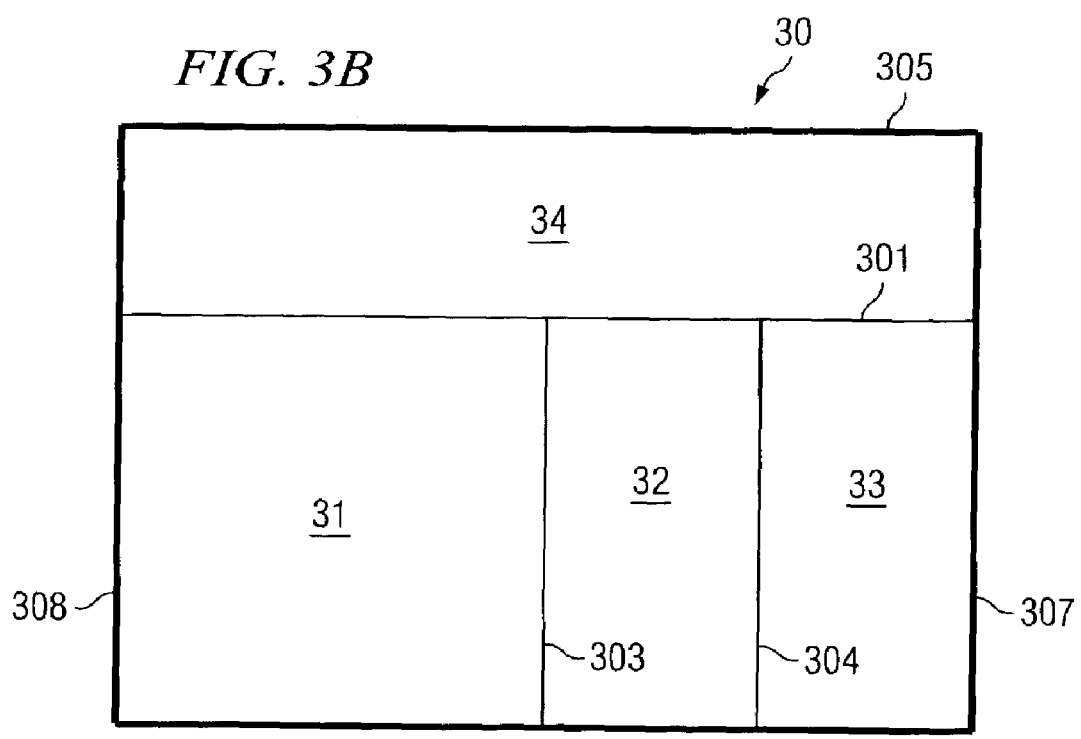
FIG. 3B is an illustration of a graphics document in which its slices have been resized according to the dragging of the feedback slice guide of FIG. 3A.

FIG. 3B is an illustration of graphics document 30 in which slices 31–34 have been re-sized according to the dragging of feedback slice guide 302 (FIG. 3A). Graphics document 30 shows slices 31–33, bound by slice boundaries 303 and 304, have been increased in size, while slice 34 has been decreased in size.

Figure 4A:
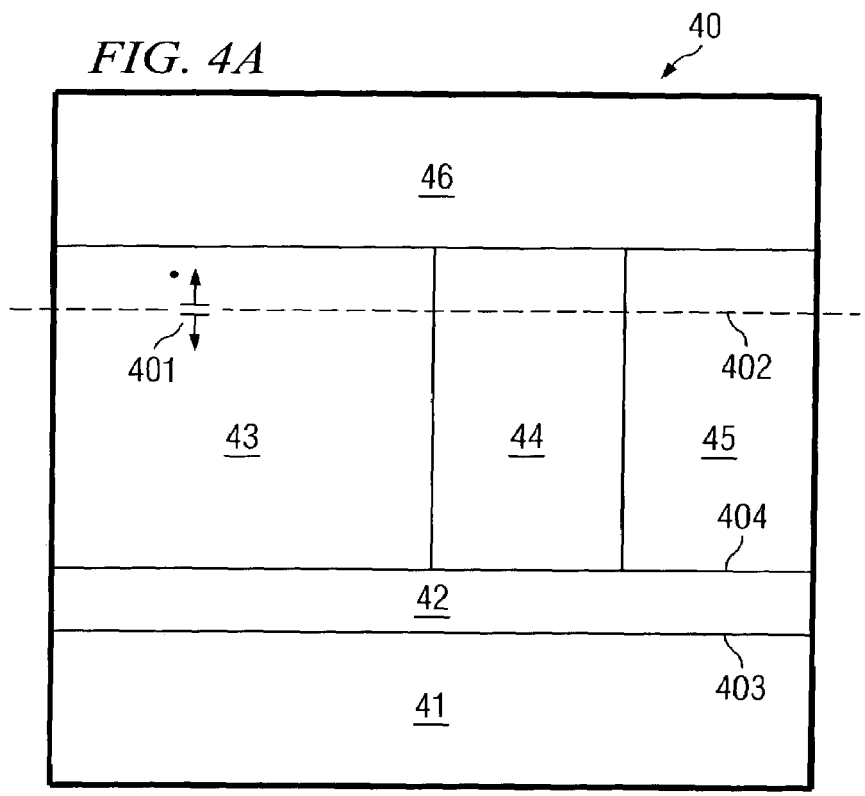
FIG. 4A is an illustration of a graphics document including slices and a blank space.

FIG. 4A is an illustration of graphics document 40 includes slices 41, 43–46, and blank space 42. Embodiments of the present invention may be configured to provide a user-selectable hot key or activator that causes any slices, with the same axis as the selected slice guide or boundary, between the beginning slice boundary and the final slice boundary of change to be collapsed to the final slice boundary as well. In graphics document 40, a user has dragged feedback slice guide 402 from slice boundary 403 using drag cursor 401. As shown, feedback slice guide 402 has been dragged across space 42 and into slices 43–45. If the user selects a hot key, which is represented by the added dot in hot-key-drag-cursor 401, slices 42–45 are picked up with slice boundary 404 being considered on the same axis as boundary 403 when feedback slice guide 402 passes over boundary 404.

Figure 4B:
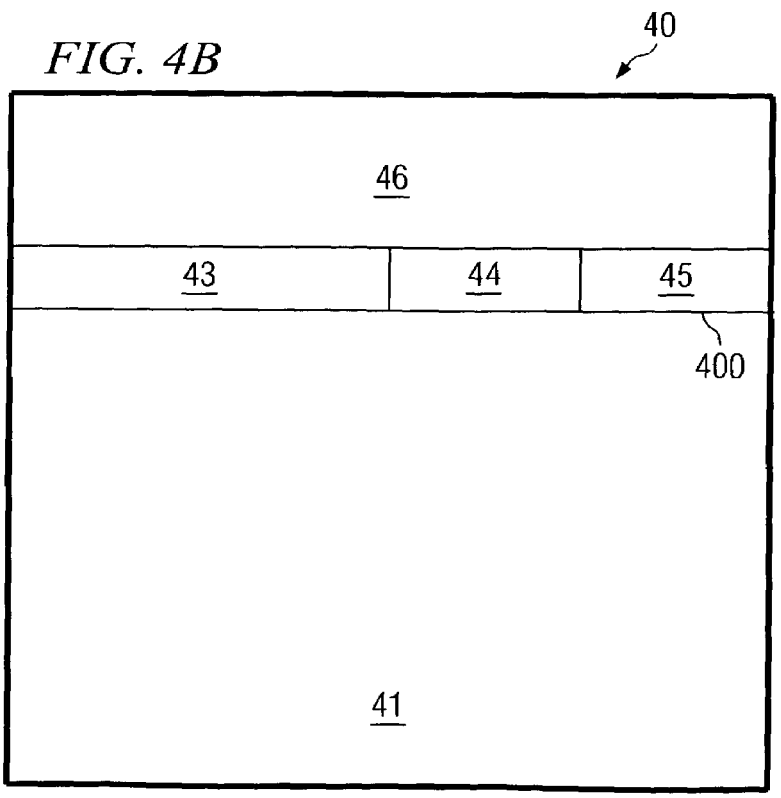
FIG. 4B is an illustration showing the completed transaction on a graphics document begun in FIG. 4A with an activated hot key.

FIG. 4B is an illustration showing the completed transaction on graphics document 40 begun in FIG. 4A with the activated hot key. Once the user selects to complete the slice resizing started in FIG. 4A and including the selected hot key, the result shows slice 41 has been greatly increased in size, while slices 43–45 were made smaller and slice 46 remains unchanged. Each boundary between slices 41–45 remain exactly matched up. As seen in FIG. 4B, space 42 (FIG. 4A), has disappeared. This is because the draggable slice guides of the present invention operate to manipulate slices and not blank spaces. However, when a draggable slice guide is dragged across a space, the slice will drag over and cover the space. Furthermore, when feedback slice guide 402 (FIG. 4A) passes over boundary 404 with the activated hot key, the boundaries of slices 41–45 are merged and collapsed to slice boundary 400.

Figure 4C:
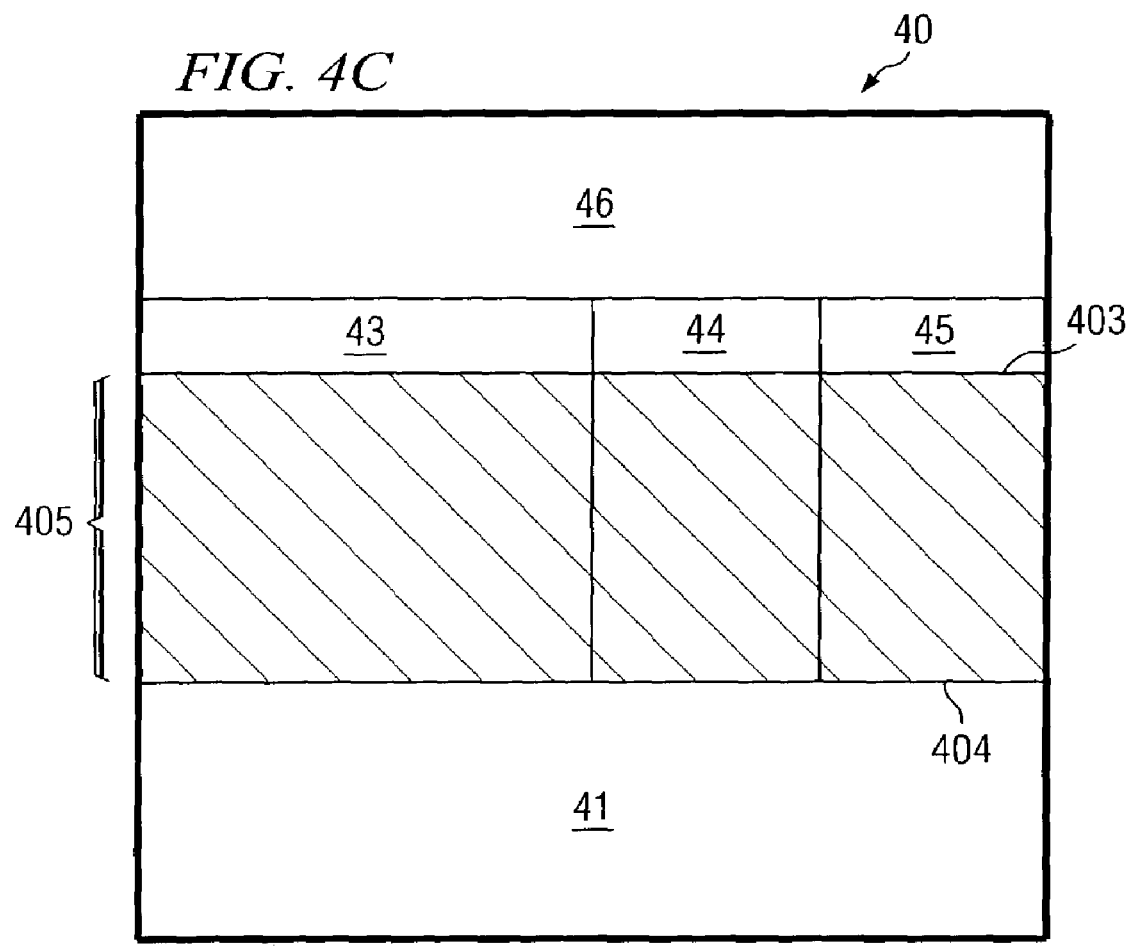
FIG. 4C is an illustration showing the completed transaction on a graphics document begun in FIG. 4A without the hot key activated.

FIG. 4C is an illustration showing the completed transaction on graphics document 40 begun in FIG. 4A without the activated hot key. If the hot key were not activated, as the user selects to resize slice 41, slice 41 is increased in size to the new position of boundary 403. However, because the hot key was not activated, slices 43–45, with slice boundary 404, were not picked up across space 42 (FIG. 4A). Therefore slices 43–45 remain bounded by lower slice boundary 404. This creates overlap area 405.

Figure 5A:
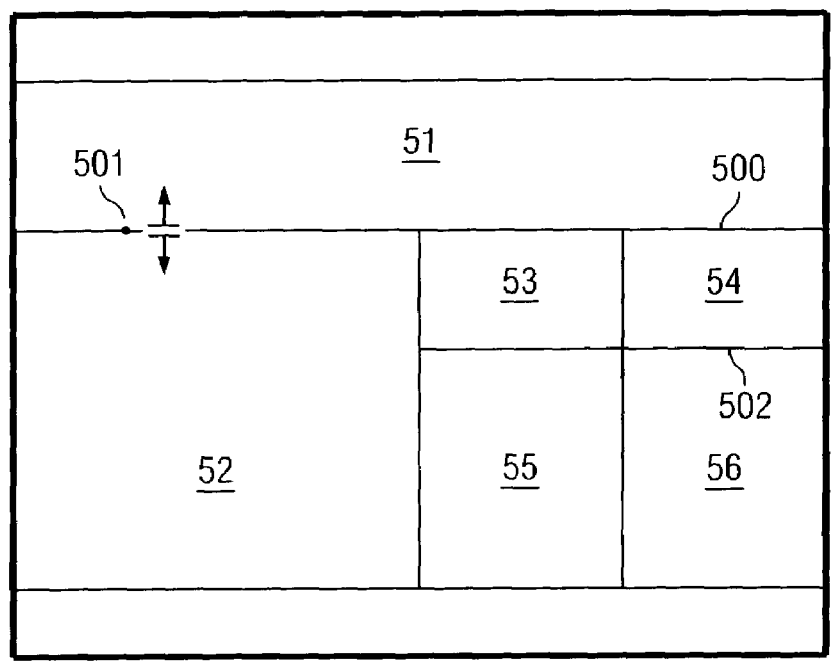
FIG. 5A is an illustration showing a graphics document having slices and boundary slice guides.
Figure 5B:
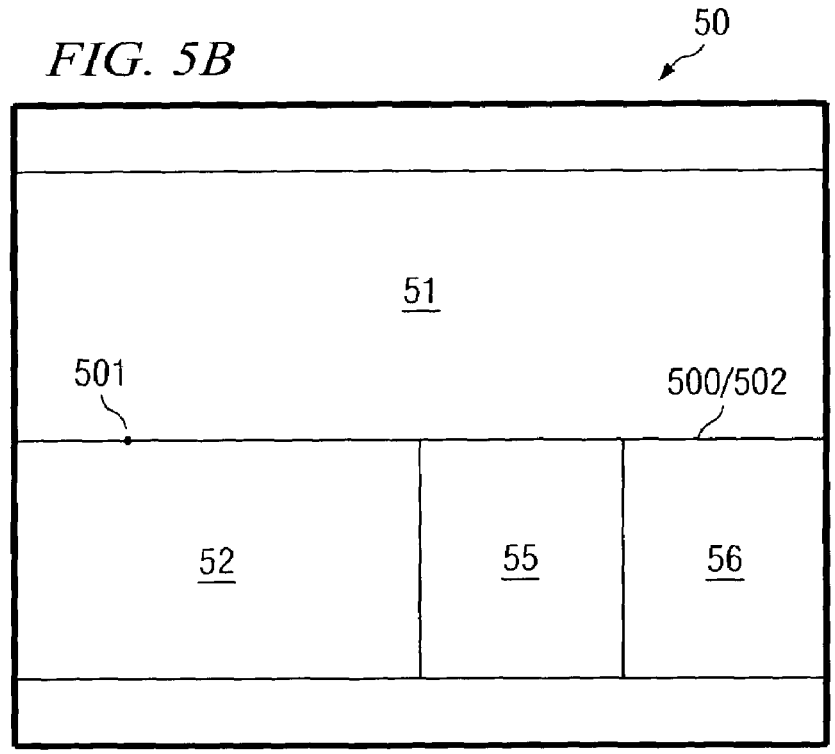
FIG. 5B is an illustration showing results of dragging the boundary slice guide in FIG. 5A.

FIG. 5A is an illustration showing graphics document 50 having slices 51–56 and boundary slice guides 500 and 502. If a user selects boundary slice guide 500 at point 501, or any point along boundary slice guide 500, and begins dragging downward toward boundary slice guide 502, slices 52–54 are joined in the simultaneous resizing because they share an axis at boundary slice guide 500. FIG. 5B is an illustration showing results of dragging boundary slice guide 500 in FIG. 5A. Graphics document 50 shows slices 51, 52, 55, and 56. Slices 53 and 54 from FIG. 5A have disappeared. Because dragging boundary slice guide 500 from point 501 has the effect of dragging the top boundary of slice 52 and slices 53 and 54 (FIG. 5A), slices 52–54 are resized. However, in this instance, boundary slice guide 500 is dragged directly to boundary slice guide 502 (FIG. 5A).

Once the user selects to make the slice size change, the new slice boundaries are calculated. Slice 51 results in a much larger slice area while slice 52 has decreased in size. Slices 53 and 54 are recalculated and result in an area of zero. Therefore, slices 53 and 54 are deleted.

FIG. 6 is a flowchart illustrating steps 60 exercised in implementing selected embodiments of the present invention. In step 600, a list of coordinates is created for each slice, each slice bound by at least a horizontal slice guide and a vertical slice guide. In step 601, the mouse position is monitored. In step 602, a drag cursor is displayed when the mouse position corresponds to one of the horizontal or vertical slice guides. When the selected slice guide is dragged, potential new slice positions are calculated, in step 603, for the slice corresponding to the selected slice guide and for each slice that has a slice guide that shares an axis with the selected slice guide responsive to said dragging. Within step 603, a larger slice area is calculated when the slice guide is dragged away from its slice, while a smaller slice area is calculated when a slice guide is dragged toward a slice. In step 604, each slice is modified according to the potential new slice positions as desired. In alternative and optional step 605, each slice situated between a beginning position of the selected slice guide and a final position of the slice guide are incorporated into the final slice position, corresponding to actuation of a hot key.

In additional embodiments of the present invention, the document within the graphics application maintains a list of slices. Slices are generally rectangular, therefore, the application maintains a list of rectangular slices comprising their positions, widths, heights, or possibly the actual bounding rectangles of x and y coordinate. From this list of slices a grid record is derived, which is used to compute the feedback slice guides that are on the document display. The grid record computation is that given all the slice positions and sizes, the feedback guides and boundary guides are computed to render the lines on the display. The effect of that calculation is that some of the lines that are computed do not actually border slices that have been drawn, so there may be slice guides that cover non-sliced areas. This grid record is a list of lines, vertical or horizontal lines comprising two end points.

So, for example, looking at FIG. 3A, the grid record may contain horizontal entries for boundary slice guides 301, 305, and 306 and feedback slice guide 302 with notations for the y coordinates for each horizontal line and then the x coordinates for the beginning and end of the lines. Similarly, there would be one for any other various vertical slice edges, such as boundary lines 303, 304, 307, and 308 with x axis locations and the set of y axis endpoints.

It should be noted that, although the various embodiments of the present invention have been described in the previous examples for manipulating slices, additional representative embodiments may be used to manipulate hotspots or similar discrete objects within graphics files. The teachings of the present invention are not limited solely to manipulating slices. Furthermore, although the various embodiments of the present invention have been described in the previous examples as manipulating only the horizontal slice guides, it should be noted that any of the horizontal or vertical slice guides may be manipulated for executing the teachings of the present invention.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, Intranet, and the like.

FIG. 7 illustrates computer system 700 adapted to use the present invention. Central Processing Unit (CPU) 701 is coupled to system bus 702. The CPU 701 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, EEPROM, Flash ROM, or the like. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects to storage devices 706, such as one or more of a hard drive, a CD drive, a floppy disk drive, a tape drive, to the computer system. The I/O adapter 705 would also allow the system to print paper copies of information, such as documents, photographs, articles, etc. Such output may be produced by a printer (e.g. dot matrix, laser, and the like), a fax machine, a copy machine, or the like. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707 to the computer system 700. The display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for manipulating a plurality of discrete objects in a graphics application, said method comprising:
   generating a set of coordinates for each discrete object, wherein said discrete objects comprise at least one of:
   a slice; and
   a hot spot;
   said each discrete object bound by at least a horizontal boundary guide and a vertical boundary guide;
   selecting said boundary guide bounding one of said plurality of discrete objects intended for manipulation;
   rendering a feedback guide responsive to said selecting;
   dragging said feedback guide to a final location; and
   resizing said one of said plurality of discrete objects intended for manipulation and others of said plurality of discrete objects that have said boundary guide sharing an axis with said selected feedback slice guide responsive to said final location.

2. The method of claim 1 further comprising:
   responsive to said dragging, calculating a new set of coordinates for said one of said plurality of discrete objects intended for manipulation and said others of said plurality of discrete objects that have said boundary guide sharing an axis with said selected boundary guide.

3. The method of claim 2 further comprising:
   determining an area of said plurality of discrete objects using said new set of coordinates for said one of said plurality of discrete objects intended for manipulation and said others of said plurality of discrete objects.

4. The method of claim 3 further comprising:
   deleting each of said plurality of discrete objects wherein said discrete object area equals zero.

5. The method of claim 1 further comprising:
   incorporating each of said plurality of discrete objects disposed between said selected boundary guide and said final location responsive to selection of a hot key.

6. The method of claim 5 wherein said incorporated each of said plurality of discrete objects share an axis direction with said selected boundary guide.

7. A method for modifying a plurality of slices on a graphics document with a single movement, said method comprising:
   creating a list of coordinates for each slice, said each slice bound by at least a horizontal boundary slice guide and a vertical boundary slice guide;
   monitoring a position of a mouse;
   selecting said boundary slice guide bounding one of said plurality of slices intended for modification;
   displaying a feedback slice guide responsive to said selecting;
   dragging said feedback slice guide to a desired final location; and
   resizing said one of said plurality of slices intended for modification and others of said plurality of slices that have said boundary slice guide sharing an axis with said selected feedback slice guide responsive to said desired final location.

8. The method of claim 7 further comprising:
   maintaining a grid record comprising:
   a list of horizontal boundary lines; and
   a list of vertical boundary lines;
   wherein said grid record is used to calculated said feedback slice guides.

9. The method of claim 8 wherein said list of horizontal boundary lines and said list of vertical boundary lines comprise:
   x and y coordinates representing said horizontal and vertical boundary lines.

10. The method of claim 1 further comprises:
    comparing said position of said mouse with said list of coordinates; and
    displaying a drag cursor when said position corresponds to one or more of said coordinates.

11. The method of claim 7 further comprising:
    prior to said resizing, calculating a new list of coordinates for said one of said plurality of slices intended for modification and said others of said plurality of slices that have said boundary slice guide sharing an axis with said selected feedback slice guide.

12. The method of claim 11 further comprising:
    calculating a slice area using said new list of coordinates for said one of said plurality of slices intended for modification and said others of said plurality of slices.

13. The method of claim 12 further comprising:
    deleting each of said plurality of slices wherein said slice area equals zero.

14. The method of claim 7 further comprising:
    incorporating each of said plurality of slices disposed between said selected boundary slice guide and said desired final location responsive to selection of a hot key.

15. The method of claim 14 wherein said incorporated each of said plurality of slices share an axis with said selected boundary slice guide.

16. A computer program product having a computer readable medium with computer program logic recorded thereon, said computer program product comprising:
    code for creating a set of coordinates for a plurality of discrete objects, wherein said plurality of discrete objects comprise at least one of:
    a plurality of slices; and
    a plurality of hot spots;
    each of said plurality of discrete objects bound by at least a horizontal boundary line and a vertical boundary line;
    code for reading a user selection of said boundary guide bounding one of said plurality of discrete objects intended for modification;
    code for displaying a feedback line responsive to said code for selecting;
    code for tracking said user dragging said feedback line to a final location; and
    code for resizing said one of said plurality of discrete objects intended for modification and others of said plurality of discrete objects that have said boundary line sharing an axis with said selected feedback line responsive to said final location.

17. The computer program product of claim 16 further comprising:
    code for maintaining a grid record comprising:
    a set of horizontal boundary lines; and
    a set of vertical boundary lines;
    wherein said grid record is used to calculated said feedback guides.

18. The computer program product of claim 17 wherein said set of horizontal boundary lines and said set of vertical boundary lines comprise:
    x and y coordinates representing said horizontal and vertical boundary lines.

19. The computer program product of claim 16 further comprising:
    code for monitoring a position of a mouse.

20. The computer program product of claim 19 further comprises:

code for comparing said position of said mouse with said list of coordinates; and code for displaying a drag cursor when said position corresponds to one or more of said coordinates.

21. The computer program product of claim 16 further comprising:

responsive to said code for tracking, code for calculating a new set of coordinates for said one of said plurality of discrete objects intended for modification and said others of said plurality of discrete objects that have said boundary line sharing an axis with said selected feedback line.

22. The computer program product of claim 21 further comprising:

code for calculating an area using said new set of coordinates for said one of said plurality of discrete objects intended for modification and said others of said plurality of discrete objects.

23. The computer program product of claim 22 further comprising:

code for deleting each of said plurality of discrete objects wherein said discrete object area equals zero.

24. The computer program product of claim 16 further comprising:

code for incorporating each of said plurality of discrete objects disposed between said selected boundary line and said final location responsive to selection of an activator key.

25. The computer program product of claim 24 wherein said incorporated each of said plurality of discrete objects share an axis with said selected boundary line.

* * * * *